US011063354B2

(12) United States Patent
Jan et al.

(10) Patent No.: US 11,063,354 B2
(45) Date of Patent: Jul. 13, 2021

(54) ANTENNA SYSTEM

(71) Applicant: Wistron NeWeb Corporation, Hsinchu (TW)

(72) Inventors: Cheng-Geng Jan, Hsinchu (TW); Chieh-Sheng Hsu, Hsinchu (TW); Tsun-Che Huang, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 0 days.

(21) Appl. No.: 16/558,178

(22) Filed: Sep. 2, 2019

(65) Prior Publication Data

US 2020/0106174 A1 Apr. 2, 2020

(30) Foreign Application Priority Data

Sep. 27, 2018 (TW) .................................. 107133942

(51) Int. Cl.
*H01Q 3/36* (2006.01)
*H01Q 3/24* (2006.01)
(Continued)

(52) U.S. Cl.
CPC .............. *H01Q 3/36* (2013.01); *H01Q 1/523* (2013.01); *H01Q 3/247* (2013.01); *H01Q 21/0025* (2013.01); *H04B 7/0413* (2013.01)

(58) Field of Classification Search
CPC ...... H01Q 3/36; H01Q 3/247; H01Q 21/0025; H01Q 1/523; H01Q 3/242; H01Q 1/246;
(Continued)

(56) References Cited

U.S. PATENT DOCUMENTS 6,225,950 B1 * 5/2001 Johansson .............. H01Q 1/246
 343/700 MS
6,448,930 B1 * 9/2002 Judd ...................... H01Q 1/007
 343/700 MS
(Continued)

FOREIGN PATENT DOCUMENTS

CN 103915677 A 7/2014
CN 105281030 A 1/2016
(Continued)

*Primary Examiner* — Renan Luque
(74) *Attorney, Agent, or Firm* — Winston Hsu

(57) ABSTRACT

An antenna system for receiving and transmitting wireless signals includes a first complex antenna including a first reflection element, a first antenna array and a second antenna array; a second complex antenna including a second reflection element, a third antenna array and a fourth antenna array, wherein the first reflection element and the second reflection element are fixed to form an included angle to each other; and a feeding device, coupled to the first complex antenna and the second complex antenna, for alternately outputting radio-frequency signals to the first complex antenna and the second complex antenna, to emit wireless signals via the first complex antenna and the second complex antenna, and switching phases of the radio-frequency signals outputted to the first complex antenna and the second complex antenna, to change characteristics of beam generated by the first complex antenna and the second complex antenna in a vertical plane.

6 Claims, 7 Drawing Sheets

(51) Int. Cl.
*H01Q 21/00* (2006.01)
*H01Q 1/52* (2006.01)
*H04B 7/0413* (2017.01)

(58) Field of Classification Search
CPC ...... H01Q 21/08; H01Q 21/062; H01Q 21/24; H04B 7/0413
See application file for complete search history.

(56) References Cited

U.S. PATENT DOCUMENTS

| | | | | |
|---|---|---|---|---|
| 7,245,261 | B2 * | 7/2007 | Zafar ................... | H01Q 1/3275 343/700 MS |
| 2005/0110683 | A1 * | 5/2005 | Song ...................... | H01Q 25/00 343/700 MS |
| 2009/0278759 | A1 * | 11/2009 | Moon .................... | H01Q 1/246 343/810 |
| 2010/0171675 | A1 * | 7/2010 | Borja ................... | H01Q 9/0414 343/798 |
| 2017/0229774 | A1 * | 8/2017 | Schuehler ................ | H01Q 3/24 |
| 2018/0026379 | A1 * | 1/2018 | Barker ................ | H01Q 21/065 343/844 |
| 2018/0233820 | A1 * | 8/2018 | Chen ................... | H01Q 21/205 |

FOREIGN PATENT DOCUMENTS

| | | |
|---|---|---|
| CN | 106549231 A | 3/2017 |
| TW | 201713052 A | 4/2017 |

* cited by examiner

ANTENNA SYSTEM

BACKGROUND OF THE INVENTION

1. Field of the Invention

The present invention relates to an antenna system, and more particularly, to an antenna system with adaptive beam alignment capability, extremely broad band applications, high antenna gain value and beam coverage rate, low cost and small volume.

2. Description of the Prior Art

An electronic product with wireless communication functions transmits or receives radio waves via an antenna to transmit or exchange wireless signals to access a wireless network. With the advance of wireless communication technology, the demand for transmission capacity and wireless network performance is also increasing. Therefore, many wireless communication systems have supported Multi-input Multi-output (MIMO) communication technology, which can greatly increase the data throughput and transmission distance of the system without increasing the bandwidth or total transmit power expenditure, so as to effectively enhance the spectrum efficiency and transmission rate of the wireless communication system and improve communication quality.

There are many types of antennas that support MIMO communication technology. A panel-type antenna has a less complex structure and is rather inexpensive. However, the beamwidth of the panel-type antenna in the horizontal plane is narrow, meaning that the beam coverage rate is low, such that it is hard to mount the panel-type antenna precisely. Moreover, the panel-type antenna lacks adaptive beam alignment capabilities. If a driving motor is applied to align the panel-type antenna in the direction with the best signal receiving quality, the drawbacks of the panel-type antenna may be compensated. However, adding the driving motor increases the manufacturing cost, involves restrictions on the installation, and is unable to meet the trend of shrinking electronic products. Although a complex antenna of cylindrical radome requires no driving motor, the antenna has a larger volume and lower antenna gain value.

Therefore, how to increase the antenna gain value and the beam coverage rate under the limited volume and cost while taking adaptive beam alignment capability into account has become one of the goals of the industry.

SUMMARY OF THE INVENTION

Therefore, the present application primarily provides an antenna system with adaptive beam alignment capability, extremely broad band applications, high antenna gain value and beam coverage rate, low cost and smaller size.

An embodiment of the present application discloses an antenna system for receiving and transmitting wireless signals comprising: a first complex antenna, comprising a first reflection element, a first antenna array and a second antenna array, wherein the first antenna array and the second antenna array are disposed on the first reflection element; a second complex antenna, comprising a second reflection element, a third antenna array and a fourth antenna array, wherein the third antenna array and the fourth antenna array are disposed on the second reflection element, and the first reflection element and the second reflection element are fixed to form an included angle to each other; and a feeding device, coupled to the first complex antenna and the second complex antenna, for alternately outputting radio-frequency signals to the first complex antenna and the second complex antenna, to emit wireless signals via the first complex antenna and the second complex antenna, and switching phases of the radio-frequency signals outputted to the first complex antenna and the second complex antenna, to change characteristics of beam generated by the first complex antenna and the second complex antenna in a vertical plane.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
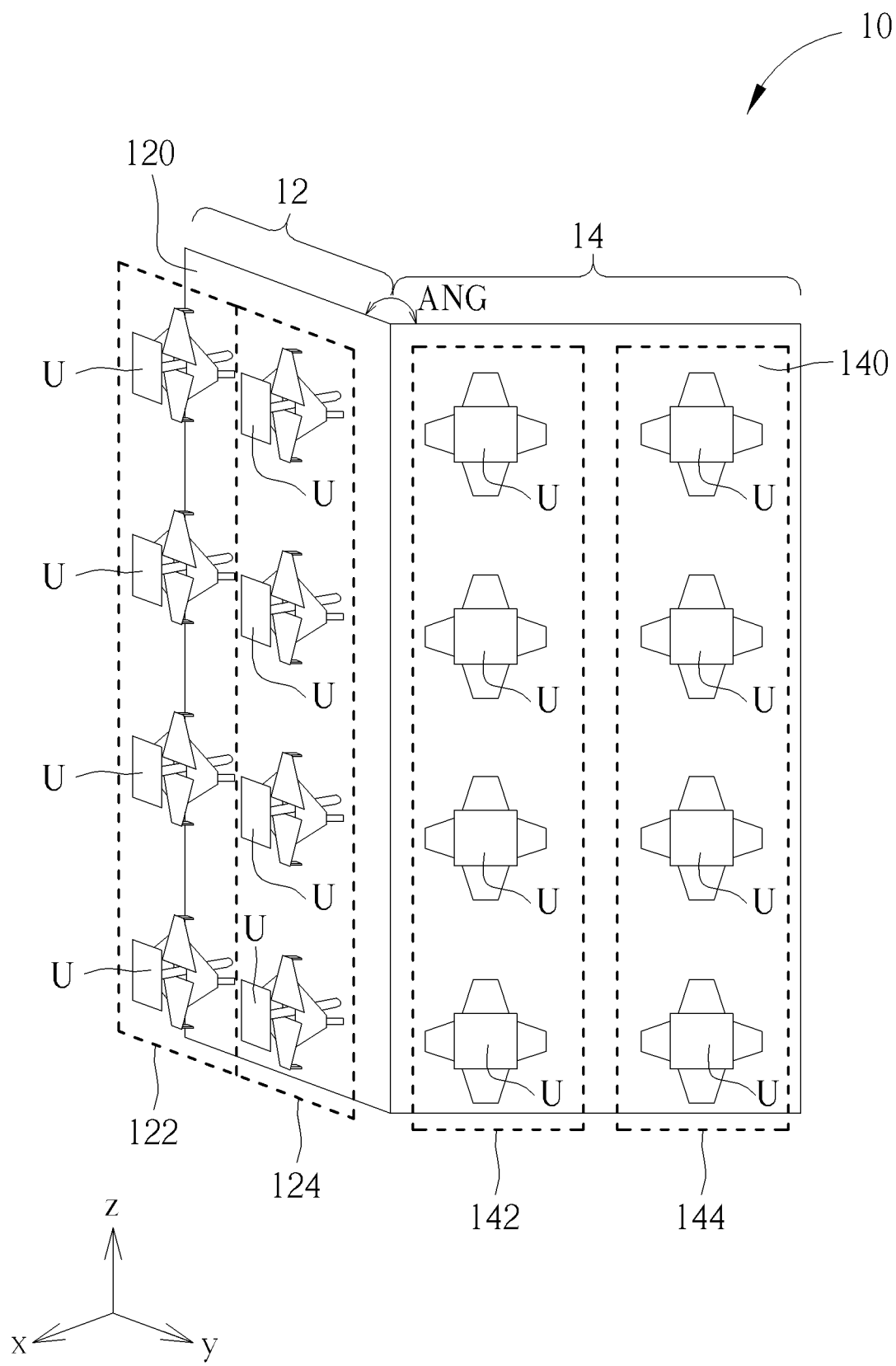
FIG. 1A is a perspective view diagram of an antenna system according to an embodiment of the present invention.
Figure 1B:
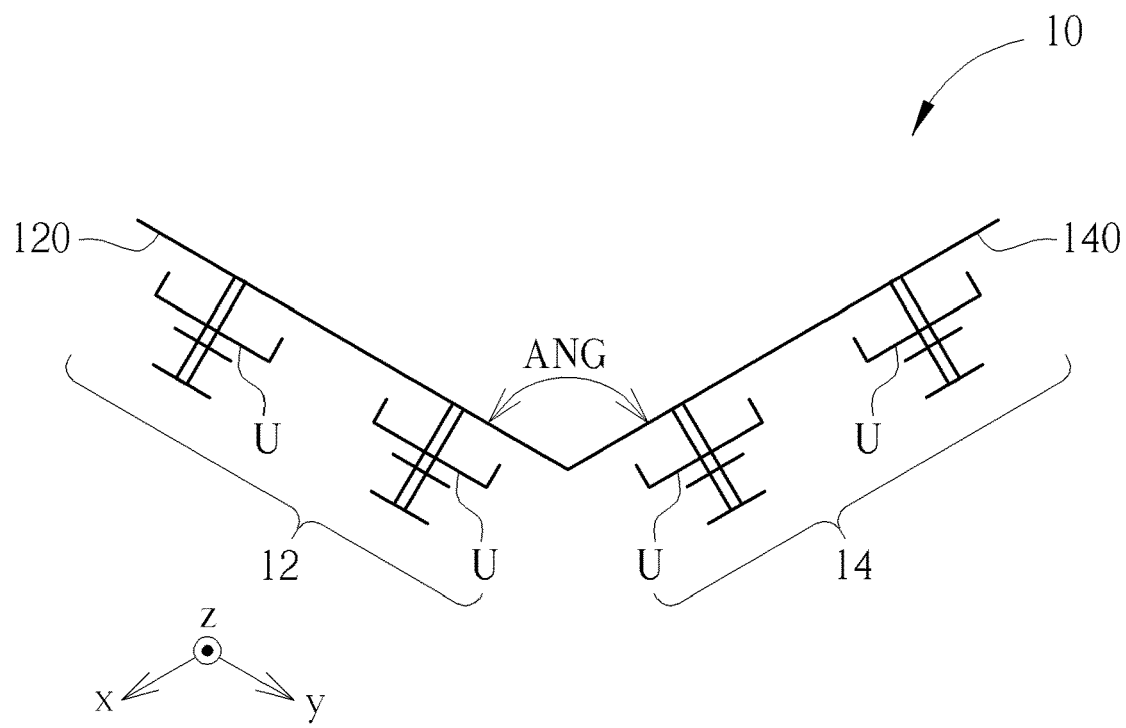
FIG. 1B is a top view diagram of the antenna system of FIG. 1A.

Please refer to FIG. 1A and FIG. 1B. FIG. 1A is a perspective view diagram of an antenna system 10 according to an embodiment of the present invention. FIG. 1B is a top view diagram of the antenna system 10. An x-y-z coordinate system is shown in FIG. 1A, FIG. 1B and subsequent figures to express the spatial relationship of the antenna system 10. The antenna system 10 is utilized for receiving and transmitting wireless signals, is capable of providing a 4×4 MIMO function, and comprises a first complex antenna 12, a second complex antenna 14, and a feeding device 16 (not shown in FIGS. 1A and 1B). The first complex antenna 12 comprises a reflection element 120 and antenna arrays 122, 124. The second complex antenna 14 comprises a reflection element 140 and antenna arrays 142, 144. The reflection elements 120, 140 are planar and rectangular metal sheets, which are able to increase the antenna gain value. The antenna arrays 122, 124, 142, 144 are respectively disposed on/above the reflection elements 120 and 140. The reflection element 120 is fixed to the reflection elements 140 at an included angle ANG with respect to the reflection elements 140; in other words, the first complex antenna 12 and the second complex antenna 14 are fixed on one side, and the included angle therebetween is ANG. The included angle ANG is in a range of 70 degrees to 150 degrees, and is primarily related to the gain value and the beam coverage rate of the antenna system 10. The included angle ANG can be 120 degrees. If the included angle ANG increases, the gain value may be increased but the beam coverage rate may decrease. Conversely, if the included angle ANG is reduced, the gain value is reduced but the beam coverage rate may be increased. Each of the antenna arrays 122, 124, 142 and 144 is a 1×4 antenna array; in other words, each of the antenna arrays 122, 124, 142 and 144 comprises four unit antennas U arranged in parallel, and the four unit antennas U have identical structures and sizes.

Figure 1C:
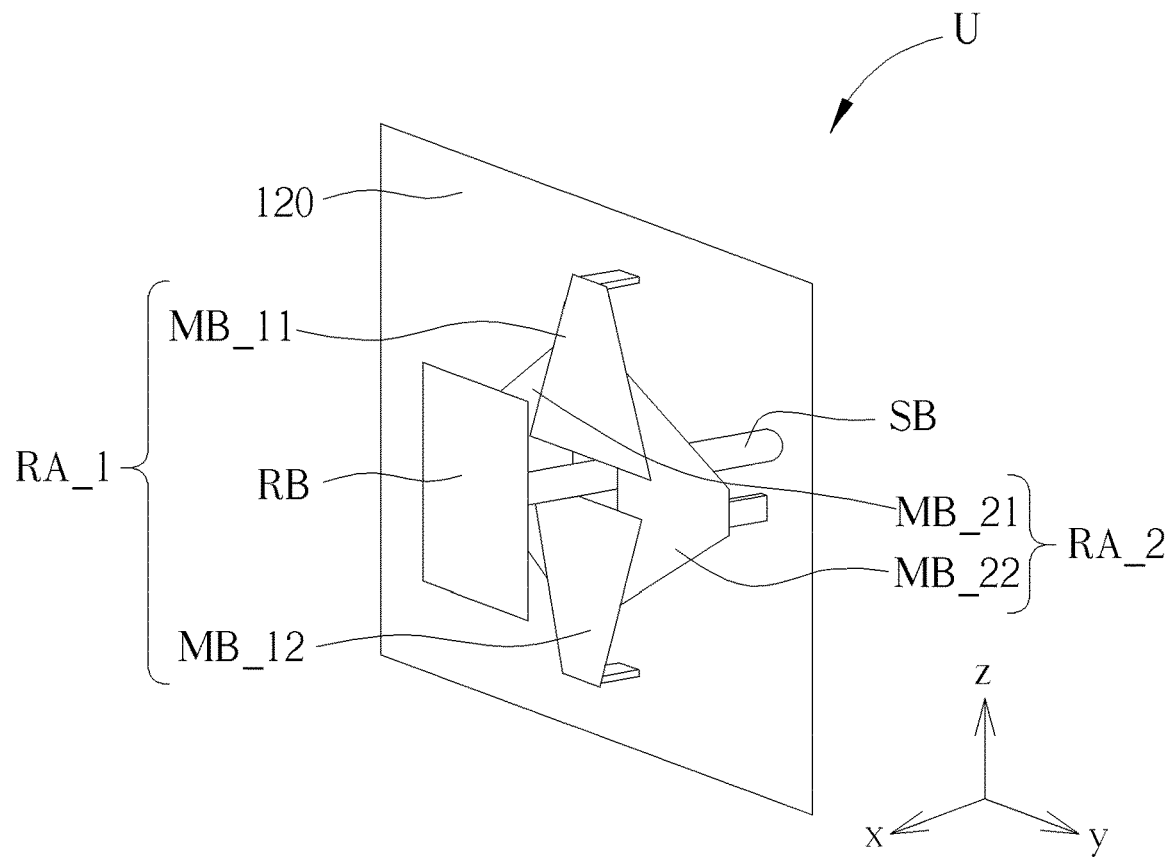
FIG. 1C is a schematic diagram of a detailed unit antenna in the antenna system of FIG. 1A.

Please also refer to FIG. 1C for the structure of the unit antenna U. FIG. 1C is a schematic diagram of a detailed unit antenna U in the antenna system 10. The unit antenna U comprises a reflection plate RB, radiant sections RA_1 and RA_2, and a supporting element SB. The reflection plate RB and the radiant sections RA_1, RA_2 are respectively disposed on/above the reflection element 120 or 140 via the supporting element SB, and are electrically isolated from each other. The reflection plate RB is used to increase the effective radiation area of the antenna and to balance the distances from the corresponding radiant sections RA_1, RA_2 to the reflection element 120 or 140, in order to equalize the equivalent distances from the radiant sections RA_1, RA_2 to the reflection element 120 or 140. The shape of the reflection plate RB is symmetric, and may be a circle or regular polygon whose number of vertices is a multiple of 4. The radiant section RA_1 comprises metal sheets MB_11, MB_12 to form a diamond dipole antenna structure. Base on the symmetry, the radiant section RA_2 comprises metal sheets MB_21, MB_22 to form another diamond dipole antenna structure. Because of the use of the diamond dipole antenna structure, the unit antenna U has extremely broad band characteristics. As long as the size of the unit antenna U is appropriately designed, the antenna system 10 may meet the band requirements of band48 and band46 in Long Term Evolution (LTE) wireless communication systems. It should be noted that, in this embodiment, the radiant section RA_1 and the radiant section RA_2 are vertically polarized and horizontally polarized, and may be appropriately modified to become 45-degree slant polarized and 135-degree slant polarized as long as the polarizations (for example, the 45-degree slant polarization and the 135-degree slant polarization) are orthogonal to each other to provide two signal channels of extremely low correlations. Meanwhile, the vertically polarized antenna and the horizontally polarized antenna (or the 45-degree slant polarized antenna and the 135-degree slant polarized antenna) should be staggered and spaced a distance apart in height to avoid interference between the two antennas. In addition, in the unit antenna U, bends are formed at the ends of the metal sheets MB_11, MB_12, MB_21, and MB_22 to improve the isolation between the antenna arrays in the same complex antenna, i.e., between the antenna arrays 122 and 124, or between antenna arrays 142 and 144.

As can be seen from the above, there is no need for the antenna system 10 to form a cyclic or an annular structure; therefore, the cost and size are reduced. Moreover, since the antenna system 10 does not need to be disposed in a cylindrical radome, the sizes of the reflection elements 120, 140 may be less limited. Alternatively, even if the antenna system 10 is disposed in a cylindrical radome, since the antenna system 10 merely has the complex antennas 12, 14, the reflection elements 120, 140 may be arbitrarily adjusted to have larger sizes than the prior art and to impose less limits on the sizes of the reflection elements 120, 140. Therefore, by appropriately designing the reflection elements 120, 140 and the included angle ANG, the gain value and beam coverage rate can be effectively improved.

Furthermore, in order to increase the beam coverage on the horizontal plane (i.e., the x-y plane), the embodiment of the present invention utilizes the feeding device 16 to have only one complex antenna being turned on and the other complex antenna being turned off at a time. Also, the two antenna arrays in the same complex antenna are turned on at the same time or turned off at the same time. In addition, the unit antenna U is a dual-polarized antenna. Accordingly, the embodiment of the present invention provides 4×4 MIMO functions. Furthermore, for the beam coverage in the vertical plane (i.e., the x-z plane), the antenna system 10 may change the phase arrangement (s) of the unit antenna (s) U in each antenna array through the feeding device 16 to change the beam forming method, thereby increasing beam coverage.

Figure 2A:
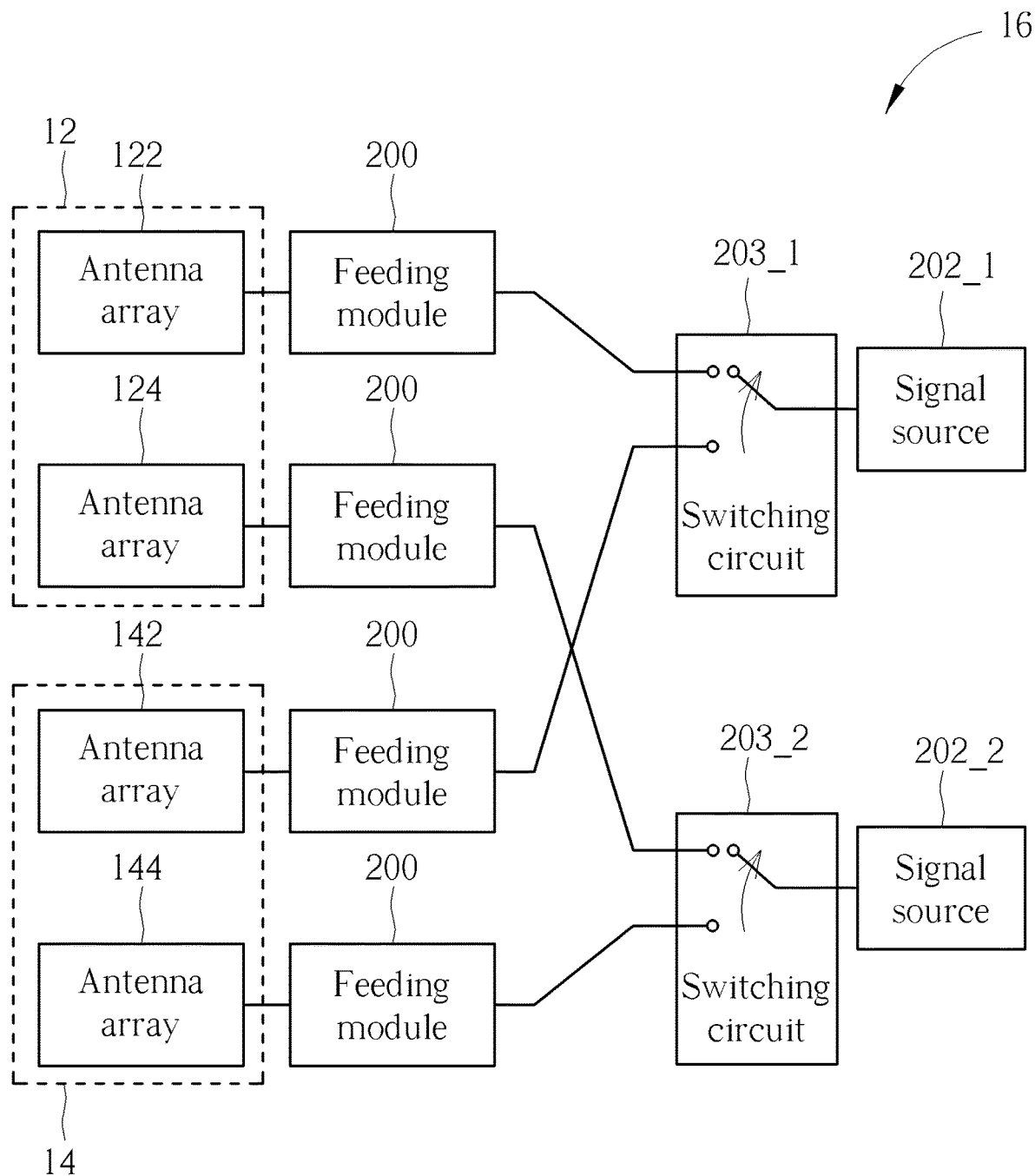
FIG. 2A is a schematic diagram of an embodiment of a feeding device according to an embodiment of the present invention.

In detail, please refer to FIG. 2A, which is a schematic diagram of an embodiment of the feeding device 16. The feeding device 16 comprises two sets of feeding modules (i.e., two feeding module sets), which respectively correspond to a vertically polarized antenna and a horizontally polarized antenna. The structures and operation principles of the feeding module sets are the same. For the sake of simplicity, FIG. 2A only shows one of the feeding module sets of the feeding device 16, which comprises four feeding modules 200. The four feeding modules 200 are utilized for all vertically polarized antennas, respectively coupled to the antenna arrays 122, 124, 142, 144, and coupled to the signal sources 202_1, 202_2 through the switching circuits 203_1, 203_2. The switching circuits 203_1 and 203_2 are respectively three-terminal components. Each of the switching circuits 203_1 and 203_2 includes an input terminal and two output terminals, and may switch the input terminal to connect to one of the output terminals. The signal source 202_1 and the switching circuit 203_1 are used for switching between the antenna array 122 and the antenna array 142, and the signal source 202_2 and the switching circuit 203_2 are used for switching between the antenna array 124 and the antenna array 144. Moreover, when the signal source 202_1 and the switching circuit 203_1 are switched to the antenna array 122, the signal source 202_2 and the switching circuit 203_2 are switched to the antenna array 124; alternatively, when the signal source 202_1 and the switching circuit 203_1 are switched to the antenna array 142, the signal source 202_2 and the switching circuit 203_2 are switched to the antenna array 144; thus, only one complex antenna is turned on at a time. That is to say, turn on only one complex antenna before starting to turn on the other complex antenna. Note that the feeding device 16 includes two sets of feeding modules (each set includes four feeding modules), and FIG. 2A illustrates one feeding module set, which is related to the vertically polarized antenna, of the feeding module sets in the feeding device 16. The feeding module set related to the horizontally polarized antenna has the same structure (that is to say, the structure is similar for horizontally polarized antenna). The other feeding module set of the feeding device 16 also comprises four feeding modules for all horizontally polarized antennas, respectively coupled to two signal sources, and between switching circuits and the antenna arrays 122, 124, 142, 144, wherein the switching circuits operate in the same switching manner as described above to form a 4×4 MIMO antenna system. In short, the feeding device 16 comprises two feeding module sets, which have the same structure and operation principle; that is, each feeding module set comprises four feeding modules coupled to two signal sources and between two switching circuits and the antenna arrays 122, 124, 142, and 144. With the switching circuits, only one complex antenna is turned on at a time, thereby achieving 4×4 MIMO function. However, without being limited thereto, any manner, in which only one complex antenna is turned on at a time while the other complex antenna is turned off, may be used in the present invention, so as to increase the beam coverage on the horizontal plane.

Figure 2B:
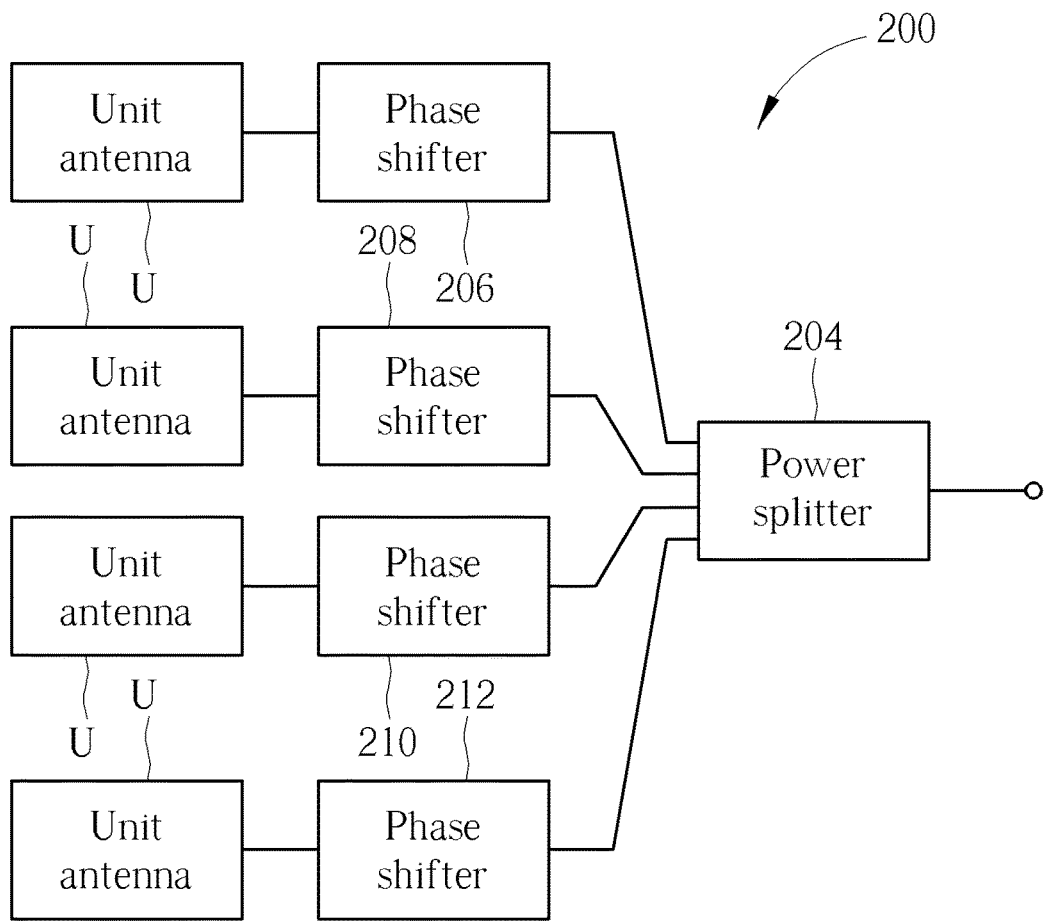
FIG. 2B is a functional block diagram of a feeding module set in FIG. 2A.

Please continue to refer to FIG. 2B. FIG. 2B is a functional block diagram of the feeding module 200. The feeding module 200 comprises a power divider (or power splitter) 204 and phase shifters 206, 208, 210, 212. The power divider 204 is a one-to-four power divider; that is, the power divider 204 comprises an input terminal and four output terminals for receiving signals of the signal source 202_1, 202_2 via the input terminal and distributing radio-frequency (RF) signals generated by the signal source 202_1, 202_2 through the four output terminals to the unit antennas U. It should be noted that each of the phase shifters 206, 208, 210, 212 may be switched to operate in different phase shift modes to switch the phases of the RF signals outputted to the first complex antenna 12 and the second complex antenna 14, such that the RF signals outputted by the power divider 204 may be transmitted to the unit antennas U in a plurality of phase states. In a phase state, the RF signals outputted by the four phase shifters 206, 208, 210, 212 have no phase difference; while in the other phase states, the RF signals outputted by the four phase shifters 206, 208, 210, 212 have phase differences. In this way, with the different phase states, the RF signals received by the antenna arrays 122, 124, 142, 144 may have no phase difference or have (different) phase differences, and may generate upward-bent, downward-bent, or undeflected beams in vertical plane, thereby increasing the beam coverage in the vertical plane.

For example, suppose the phase shifter 206 has two phase shift modes of 0 degrees and −90 degrees, the phase shifter 208 has two phase shift modes of 0 degrees and 180 degrees, the phase shifter 210 has two phase shift modes of 0 degrees and +90 degrees, and the phase shifters 212 have two phase shift modes of 0 degrees and 180 degrees. In a first phase state, the phase shifters 206, 208, 210, and 212 all operate in the 0 degree phase shift mode; that is, the RF signals outputted by the phase shifters 206, 208, 210, and 212 have no phase difference, such that the RF signals received by the corresponding antenna array (one of the antenna arrays 122, 124, 142, and 144) is a continuous phase input with 0 degrees difference. In a second phase state, the phase shifter 206 operates in the −90 degree phase shift mode, the phase shifters 208 operates in the +180 degree phase shift mode, the phase shifters 210 operates in the +90 degree phase shift mode, and the phase shifters 212 operates in the 0 degree phase shift mode, such that the RF signals received by the corresponding antenna array is a continuous phase input with a difference of +90 degrees. In a third phase state, the phase shifter 206 operates in the −90 degree phase shift mode, the phase shifter 208 operates in the 0 degree phase shift mode, the phase shifter 210 operates in the +90 degree phase shift mode, and the phase shifter 212 operates in the 180 degree phase shift mode, such that the RF signals received by the corresponding antenna array is a continuous phase input with a difference of −90 degrees. In other words, in the first phase state, the second phase state, and the third phase state, the input phase values of the antenna array 12 or 14 are respectively 0 degrees difference continuous input of undeflected beam, +90 degree difference continuous input of upward-bent beam (or upward deflecting beam), and −90 degree difference continuous input of downward-bent beam, such that three types of beams are formed to increase beam coverage. Therefore, as long as the phase shift modes of the phase shifters 206, 208, 210, 212 are properly switched or adjusted, the corresponding antenna array can have phase difference inputs with different angles, thereby generating different beams to increase the beam coverage in the vertical plane.

Figure 2C:
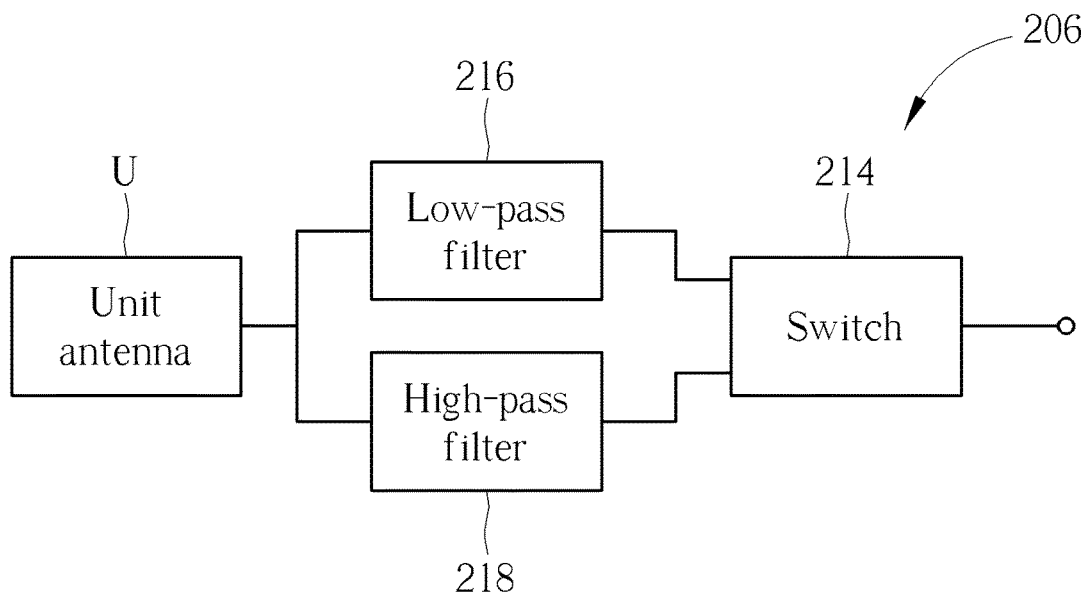
FIG. 2C is a schematic diagram of an embodiment of a phase shifter in FIG. 2B.

To achieve each of the phase shifters 206, 208, 210, 212 having two phase shift modes, in an embodiment, a combination of a switch and high-pass, low-pass filters may be utilized. For example, please refer to FIG. 2C. FIG. 2C is a schematic diagram of an embodiment of the phase Shifter 206. In this embodiment, the phase shifter 206 comprises a switch 214, a low-pass filter 216, and a high-pass filter 218. The switch 214 is coupled to the power divider 204. The switch 214 is able to output the RF signals outputted by the power divider 204 to the low-pass filter 216 or the high-pass filter 218 according to different phase states. In this way, as long as the component values inside the low-pass filter 216 and the high-pass filter 218 are appropriately selected, it is possible to have a phase difference of 90 degrees or 180 degrees before and after switching. In addition, the phase shifters 208, 210, 212 can be implemented in the same way as the phase shifter 206 or by slight modification of the phase shifter 206. For example, the phase shift mode of −90 degrees may be generated by exchanging the positions of the low-pass filter and the high-pass filter under the 90-degree structure, and it is not limited here.

As can be seen from the above, the antenna system 10 does not need to form a cyclic structure, so that the cost and the volume may be reduced, the appearance is close to a flat shape (or a sheet-like shape), and the antenna system 10 is suitable for hanging on a wall. In terms of the antenna structure, each of the antenna arrays 122, 124, 142, and 144 is a 1×4 antenna array that can effectively increase the gain value in the beam coverage; the ends of the radiant section RA_1 and the radiant section RA_2 of the unit antenna U are bent downward to improve the antenna isolation, and the unit antenna U adopts a diamond dipole antenna structure to achieve broad band operation. Furthermore, the feeding device 16 turns on only one complex antenna at a time, the complex antenna comprises two 1×4 antenna arrays, and each unit antenna U is a dual-polarized antenna, such that the embodiment of the present invention provides 4×4 MIMO function and improves the beam coverage in the horizontal plane effectively. Moreover, the feeding device 16 may change the beam forming method by changing the phase arrangement (s) of the RF signals received by the unit antenna(s) U of the antenna arrays, thereby increasing the beam coverage in the vertical plane.

Figure 3:
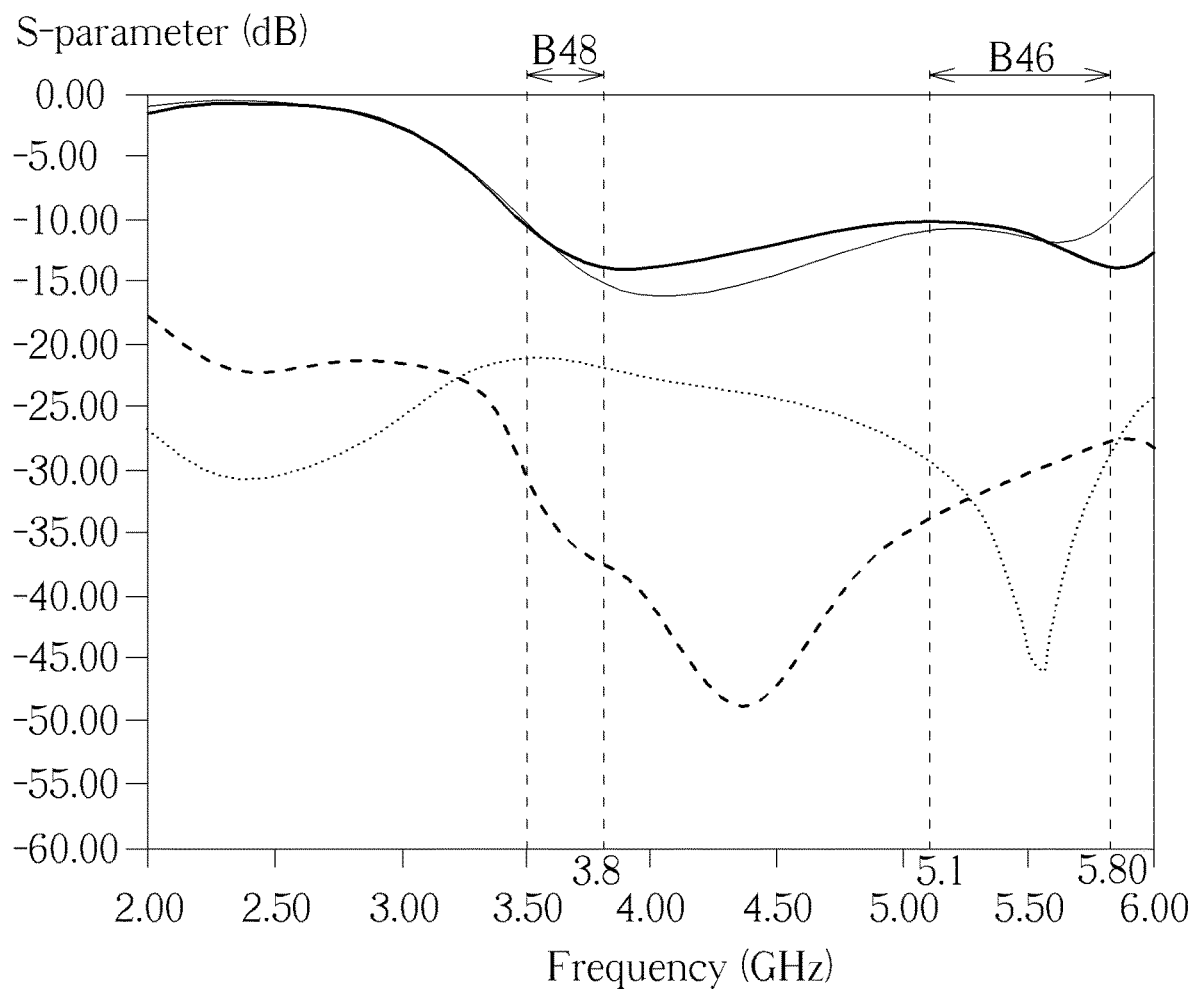
FIG. 3 is a schematic diagram of resonance characteristics and isolation of an antenna array in the antenna system of FIG. 1A.

In order to verify functionality of the antenna system 10, an HFSS simulation software is first applied to calculate and obtain a schematic diagram of resonance and isolation characteristics of the antenna array 122 in the antenna system 10, as shown in FIG. 3, where the resonance characteristics (S-parameter) of the vertically and horizontally polarized antennas are presented by a thick solid curve and a thin solid curve respectively. As can be seen, the S11 of the antenna array 122 is less than −10.3 dB and meet the frequency band requirements of band48 and band46 in the LTE wireless communication system. Meanwhile, the isolation (S-parameter) between the vertically polarized antenna and the horizontally polarized antenna inside the antenna unit U of antenna array 122 is presented by a dashed curve in FIG. 3. As can be seen, the isolation between the two is greater than 30.7 dB. Furthermore, the isolation (S-parameter) between antenna array 122 and the other antenna arrays presented by a dotted curve in FIG. 3 is greater than 21.0 dB. The other antenna arrays have similar characteristics and hence are not detailed redundantly.

Figure 4A:
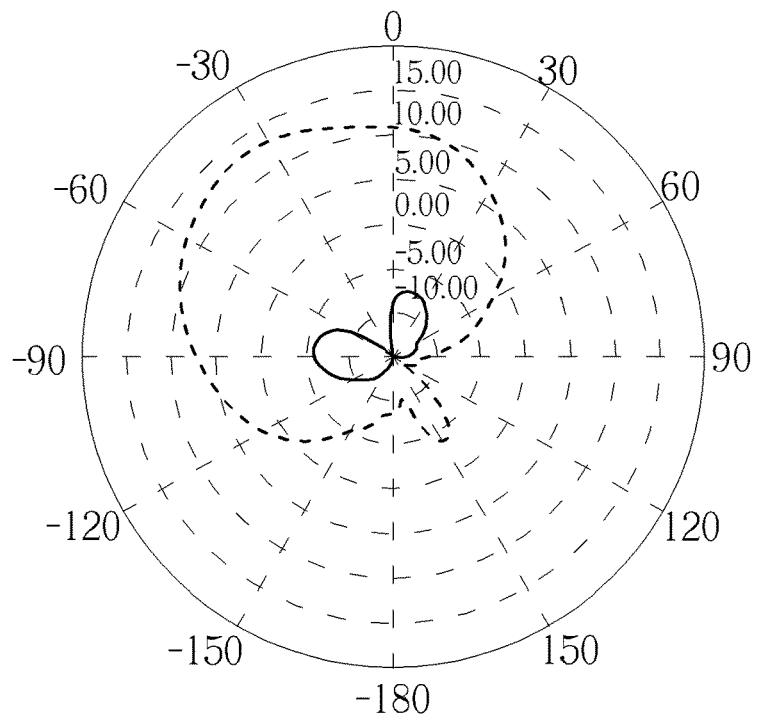
FIG. 4A is a gain value field pattern of a vertically polarized antenna of an antenna array in the antenna system of FIG. 1A.
Figure 4B:
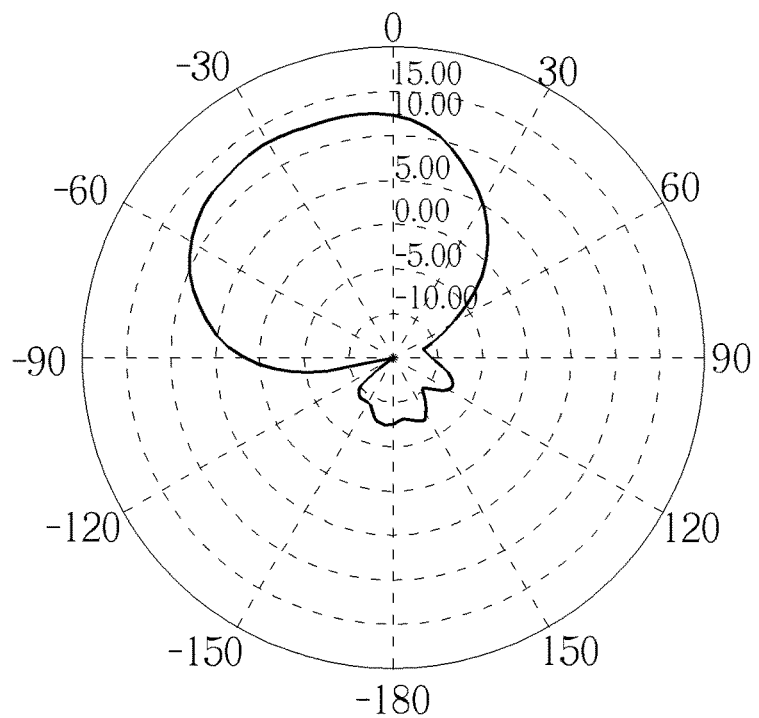
FIG. 4B is a gain value field pattern of a horizontally polarized antenna of an antenna array in the antenna system of FIG. 1A.

Next, FIG. 4A is a gain value field pattern of the vertically polarized antenna of the antenna array 122 at 3500 MHz in the horizontal plane, and FIG. 4B is a gain value field pattern of the horizontally polarized antenna of the antenna array 122 at 3500 MHz in the horizontal plane. As can be seen from FIG. 4A and FIG. 4B, both the vertically polarized antenna and the horizontally polarized antenna of the antenna array 122 have high gain values, desired orthogonal polarization isolation (or common polarization to cross polarization (Co/Cx) parameter), desired front-to-back (F/B) ratio and proper beamwidth. Similarly, the other antenna arrays have similar characteristics and have the same or similar receiving effects, so that the antenna arrays in the same complex antenna (i.e., the antenna arrays 122 and 124, or the antenna arrays 142 and 144) can be simultaneously turned on and the (maximum) gain value is about 13 dBi to the maximum.

Figure 5A:
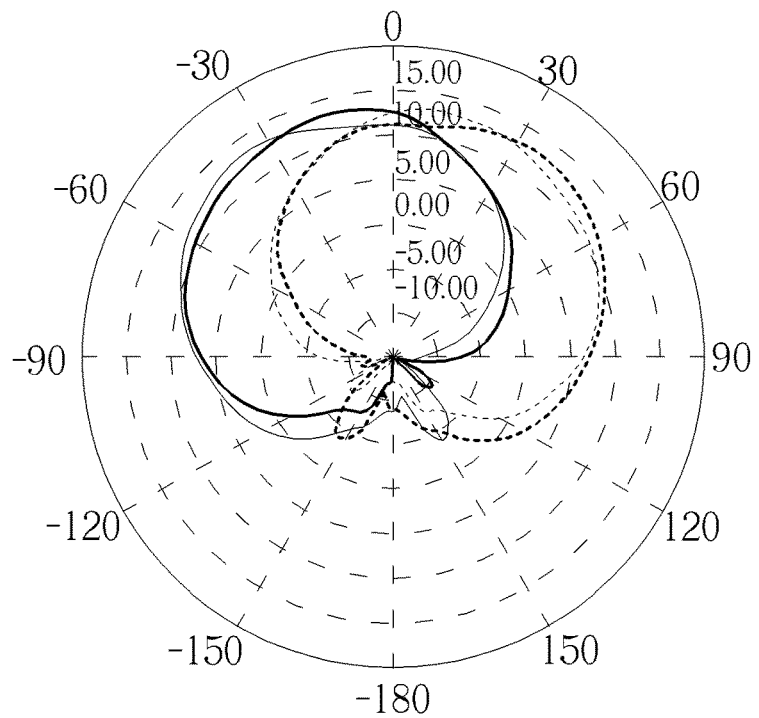
FIG. 5A is a gain value field pattern of beam coverage of vertically polarized antennas of all antenna arrays in the antenna system of FIG. 1A.
Figure 5B:
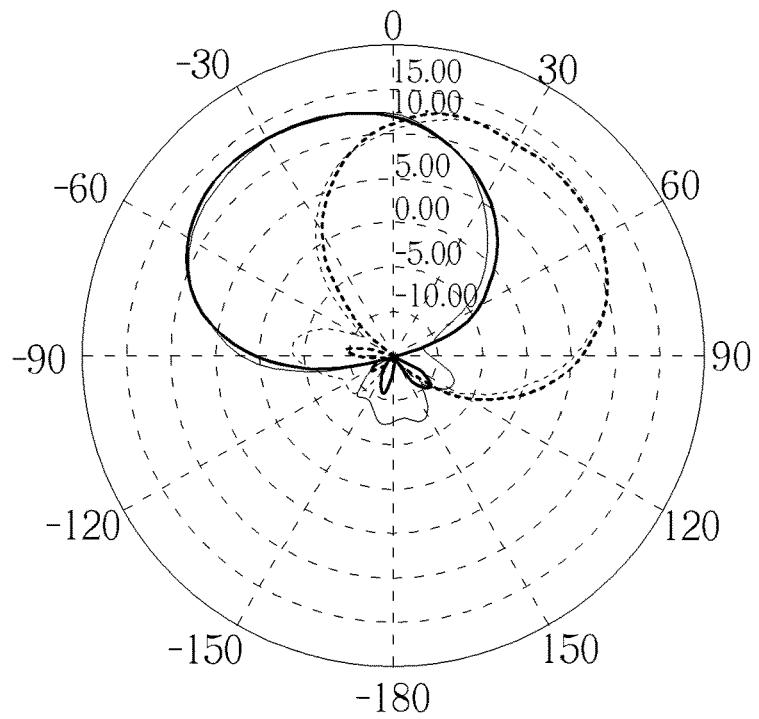
FIG. 5B is a gain value field pattern of beam coverage of horizontally polarized antennas of all antenna arrays in the antenna system of FIG. 1A.

In addition, as described above, the feeding device 16 is switched between two complex antennas, and only two antenna arrays in one complex antenna are turned on at a time to increase the beam coverage in the horizontal plane and provide 4×4 MIMO function. In this case, please refer to FIG. 5A and FIG. 5B. FIG. 5A is a gain value field pattern of beam coverage of the vertically polarized antennas of the antenna arrays 122, 124, 142 and 144 at 3500 MHz in the horizontal plane, and FIG. 5B is a gain value field pattern of beam coverage of the horizontally polarized antennas of the antenna arrays 122, 124, 142 and 144 at 3500 MHz in the horizontal plane. In FIG. 5A and FIG. 5B, gain value field patterns of the antenna arrays 122, 124, 142, and 144 are presented by a solid curve, a thick solid curve, a dotted curve, and a thick dotted curve respectively. As can be seen, the antenna system 10 is half-plane beam covered (or half-plane beam coverage), where the beam coverage is at least 120 degrees, and other frequency points have similar results.

In addition, the software simulation shows that 3 dB beamwidth of the vertically or horizontally polarized antenna of the antenna arrays 122, 124, 142 and 144 in the vertical plane is about 20 degrees. However, as described above, the feeding device 16 may change the phase arrangement (s) of the RF signals received by the antenna arrays 122, 124, 142 and 144, and may generate upward-bent, downward-bent, or undeflected beams in the vertical plane, thereby forming three beams to increase beam coverage.

It should be noted that the antenna system 10 is an exemplary embodiment of the present invention, and those skilled in the art may readily make different alternations and modifications. For example, the first complex antenna 12 and the second complex antenna 14 of the antenna system 10 may be mutually fixed because the reflection elements 120 and 140 are connected on one side; alternatively, the first complex antenna 12 and the second complex antenna 14 of the antenna system 10 may be connected to each other by a connecting shaft; alternatively, the first complex antenna 12 and the second complex antenna 14 of the antenna system 10 may be fixed on a base without being electrical connected. In addition, the first complex antenna 12 and the second complex antenna 14 are relatively fixed according to a specific included angle ANG. Nevertheless, with appropriate mechanism design of the first complex antenna 12 and the second complex antenna 14, the included angle ANG may vary within certain angular range to increase the flexibility of signal transmission and reception and to ensure ease of disposition and facility of utilization, which is also within the scope of the present invention. Furthermore, depending on the operation frequency band and bandwidth of the wireless communication system, the reflection plate RB of the unit antenna U may also be removed from the antenna components. The reflection elements 120, 140 may also form a frustum structure by adding peripheral reflective elements to increase gain value. Moreover, the metal sheets MB_11, MB_12, MB_21, and MB_22 of the radiant sections RA_1 and RA_2 of the unit antenna U may be other antenna structures apart from the diamond dipole antenna structure. Moreover, the feeding device 16 turns on only one complex antenna at a time to achieve 4×4 MIMO function, and changes the beam forming method by changing phase arrangement(s). The present invention is not limited thereto, and any method which can achieve the same function is suitable for the present invention.

In summary, the antenna system of the present invention has an appearance close to a flat shape, occupies smaller volume (to be compact), can effectively improve the gain value, isolation and operation bandwidth, can provide 4×4 MIMO functions, and can effectively improve the beam coverage in vertical plane and in horizontal plane.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An antenna system, for receiving and transmitting wireless signals, comprising:
   a first complex antenna, comprising a first reflection element, a first antenna array and a second antenna array, wherein the first antenna array and the second antenna array are disposed on the first reflection element;
   a second complex antenna, comprising a second reflection element, a third antenna array and a fourth antenna array, wherein the third antenna array and the fourth antenna array are disposed on the second reflection element, and the first reflection element and the second reflection element are fixed to form an included angle to each other; and
   a feeding device, coupled to the first complex antenna and the second complex antenna, for alternately outputting radio-frequency signals to the first complex antenna and the second complex antenna, to emit wireless signals via the first complex antenna and the second complex antenna, and switching phases of the radio-frequency signals outputted to the first complex antenna and the second complex antenna, to change characteristics of beam generated by the first complex antenna and the second complex antenna in a vertical plane, wherein each of the first antenna array, the second antenna array, the third antenna array, and the fourth antenna array is a 1×4 antenna array, the 1×4 antenna array comprises four unit antennas, the four unit antennas have identical structures and sizes, and each of the four unit antennas comprises at least one radiant section disposed on the first reflection element or the second reflection element, each of a first metal sheet and a second metal sheet of the at least one radiant section comprises a bend, wherein the first metal sheet and the second metal sheet of the at least one radiant section form a diamond dipole antenna structure, the feeding device comprises two feeding module sets, respectively coupled to vertically polarized antennas and horizontally polarized antennas within the first antenna array, the second antenna array, the third antenna array and the fourth antenna array, and each of the two feeding module sets comprises four feeding modules respectively corresponding to the first antenna array, the second antenna array, the third antenna array, and the fourth antenna array, and each feeding module comprises:

a power divider, comprising an input terminal coupled to a signal source, and four output terminals, for distributing radio-frequency signals generated by the signal source to the four output terminals; and four phase shifters, respectively coupled to one of the four output terminals and one of the four unit antennas, for outputting radio-frequency signals outputted by the power divider to the four unit antennas in a plurality of phase states;

wherein, in one of the plurality of phase states, radio-frequency signals outputted by the four phase shifters have no phase difference, and in other of the plurality of phase states, radio-frequency signals outputted by the four phase shifters have phase difference;

wherein the four phase shifters are respectively switched between at least two phase shift modes, to switch the phases of the radio-frequency signals outputted to the first complex antenna and the second complex antenna.

2. The antenna system of claim 1, wherein the included angle is in a range of 70 degrees to 150 degrees.

3. The antenna system of claim 1, wherein each of the four phase shifters comprises:

a low-pass filter, coupled to the unit antenna, corresponding to one of the at least two phase shift modes;

a high-pass filter, coupled to the unit antenna, corresponding to another one of the at least two shift modes; and a switch, coupled to the low-pass filter and the high-pass filter, for outputting the radio-frequency signals outputted by the power divider to one of the low-pass filter and the high-pass filter.

4. The antenna system of claim 1, wherein each of the feeding module sets further comprises:

a first switching circuit, comprising an input terminal coupled to a first signal source, and two output terminals coupled to two feeding modules corresponding to the first antenna array and the third antenna array within the four feeding modules, for switching the input terminal to connect to one of the two output terminals; and a second switching circuit, comprising an input terminal coupled to a second signal source, and two output terminals coupled to two feeding modules corresponding to the second antenna array and the fourth antenna array within the four feeding modules, for switching the input terminal to connect to one of the two output terminals.

5. The antenna system of claim 4, wherein when the first switching circuit connects the first signal source and a feeding module corresponding to the first antenna array within the four feeding modules, the second switching circuit connects the second signal source and a feeding module corresponding to the second antenna array within the four feeding module; and when the first switching circuit connects the first signal source and a feeding module corresponding to the third antenna array within the four feeding module, the second switching circuit connects the second signal source and a feeding module corresponding to the fourth antenna array within the four feeding module.

6. The antenna system of claim 1, wherein each of the unit antennas further comprises:

a reflection plate, disposed on the at least one radiant section, having a shape with symmetry.

* * * * *